(12) United States Patent
Gyugyi et al.

(10) Patent No.: US 7,860,912 B1
(45) Date of Patent: Dec. 28, 2010

(54) RANDOM NUMBER GENERATOR WITH IMPROVED UNIFORMITY FOR NETWORKING

(75) Inventors: Paul J. Gyugyi, Sunnyvale, CA (US); Tony C. Tam, Redwood City, CA (US)

(73) Assignee: Nvidia Corporation, Santa Clara, CA (US)

( * ) Notice: Subject to any disclaimer, the term of this patent is extended or adjusted under 35 U.S.C. 154(b) by 1024 days.

(21) Appl. No.: 11/608,275

(22) Filed: Dec. 8, 2006

(51) Int. Cl.
*G06F 7/58* (2006.01)
(52) U.S. Cl. ..................................................... 708/254
(58) Field of Classification Search .......... 708/250–256
See application file for complete search history.

(56) References Cited

U.S. PATENT DOCUMENTS

| | | | | | |
|---|---|---|---|---|---|
| 3,633,015 | A | * | 1/1972 | Lee | 708/252 |
| 3,746,847 | A | * | 7/1973 | Maritsas | 708/250 |
| 3,946,215 | A | * | 3/1976 | May | 708/252 |
| 5,268,899 | A | * | 12/1993 | Brown | 370/448 |
| 5,533,128 | A | * | 7/1996 | Vobach | 380/28 |
| 5,570,307 | A | * | 10/1996 | Takahashi | 708/256 |
| 7,113,966 | B2 | * | 9/2006 | Epstein | 708/250 |
| 7,395,288 | B2 | * | 7/2008 | Fujita et al. | 708/251 |
| 2003/0014451 | A1 | * | 1/2003 | Peyser et al. | 708/250 |
| 2003/0131031 | A1 | * | 7/2003 | Klass | 708/250 |
| 2003/0236803 | A1 | * | 12/2003 | Williams | 708/252 |
| 2004/0064491 | A1 | * | 4/2004 | Rarick | 708/250 |
| 2005/0044119 | A1 | * | 2/2005 | Langin-Hooper et al. | 708/250 |
| 2007/0244950 | A1 | * | 10/2007 | Golic | 708/250 |

* cited by examiner

*Primary Examiner*—Chat C Do
(74) *Attorney, Agent, or Firm*—Cooley LLP (57) ABSTRACT

An embodiment of the invention includes a first pseudo-random number generator that is configured to produce a first sequence of values at a first clock rate. Also, a second pseudo-random number generator is configured to produce a second sequence of values at a second clock rate. The second clock rate is based on the first sequence of values and the first clock rate. A logical module is connected to the first pseudo-random number generator and the second pseudo-random number generator. The logical module is configured to produce an output value based on at least a portion of a value from the first sequence of values and at least a portion of a value from the second sequence of values.

6 Claims, 7 Drawing Sheets

RANDOM NUMBER GENERATOR WITH IMPROVED UNIFORMITY FOR NETWORKING

BRIEF DESCRIPTION OF THE INVENTION

The disclosed invention relates to random number generators, and, in particular, to pseudo-random number generator methods and apparatus.

BACKGROUND

In many areas of technology a random number generator that produces a uniform and uncorrelated output is desirable. For example, it is beneficial to use a uniform and uncorrelated random number generator to determine the delay period in an Ethernet collision detection and/or avoidance protocol. A uniform and uncorrelated random number generator output, in this case, will help to prevent Ethernet devices from preferentially transmitting before any other and avoid deadlock situations where Ethernet devices repeatedly pick identical delays.

Random number generators are typically based either on physical phenomenon or on a computational procedure. Physical phenomenon, such as white noise, radioactive decay, and thermal noise can be used to generate a random number, however, these types of random number generators can be prohibitively difficult to implement in some applications and can be subject to physical interferences (e.g., random transmission signals in the air). Computationally-based random number generators can be more easily implemented in a variety of applications, but usually lack uniformity or have undesirable correlation characteristics (e.g., high correlation). For example, although a pseudo-random number generator can produce a uniform output series, the series is a set of state values that is repeatedly produced by the pseudo-random number generator and, thus, highly correlated.

Accordingly, a need exists for improved methods and apparatus for producing a computationally-based random number.

SUMMARY OF THE INVENTION

An embodiment of the invention includes a first pseudo-random number generator that is configured to produce a first sequence of values at a first clock rate. Also, a second pseudo-random number generator is configured to produce a second sequence of values at a second clock rate. The second clock rate is based on the first sequence of values and the first clock rate. A logical module is connected to the first pseudo-random number generator and the second pseudo-random number generator. The logical module is configured to produce an output value based on at least a portion of a value from the first sequence of values and at least a portion of a value from the second sequence of values.

In another embodiment of the invention, a method includes receiving a first value from a first pseudo-random number generator. The first value is from a first sequence of values produced by the first pseudo-random number generator based on a first clock rate. The method also includes modifying the first value using a second value from a second pseudo-random number generator. The second value is from a second sequence of values produced by the second pseudo-random number generator based on a second clock rate defined based on the first sequence of values.

In yet another embodiment of the invention, an apparatus includes a pseudo-random number generator configured to produce an intermediate sequence of values based on a timing signal. The apparatus also includes a logical module configured to produce a sequence of output values based on the timing signal and based on the intermediate sequence of values. The sequence of output values defines a grand cycle that has a plurality of output segments. A number of values within each output segment from the plurality of output segments corresponds with a number of values from the intermediate sequence of values.

BRIEF DESCRIPTION OF THE DRAWINGS

Embodiments of the invention are described with reference to the accompanying drawings. In the drawings, identical or like reference numbers indicate identical or functionally similar elements.

DETAILED DESCRIPTION

Figure 1:
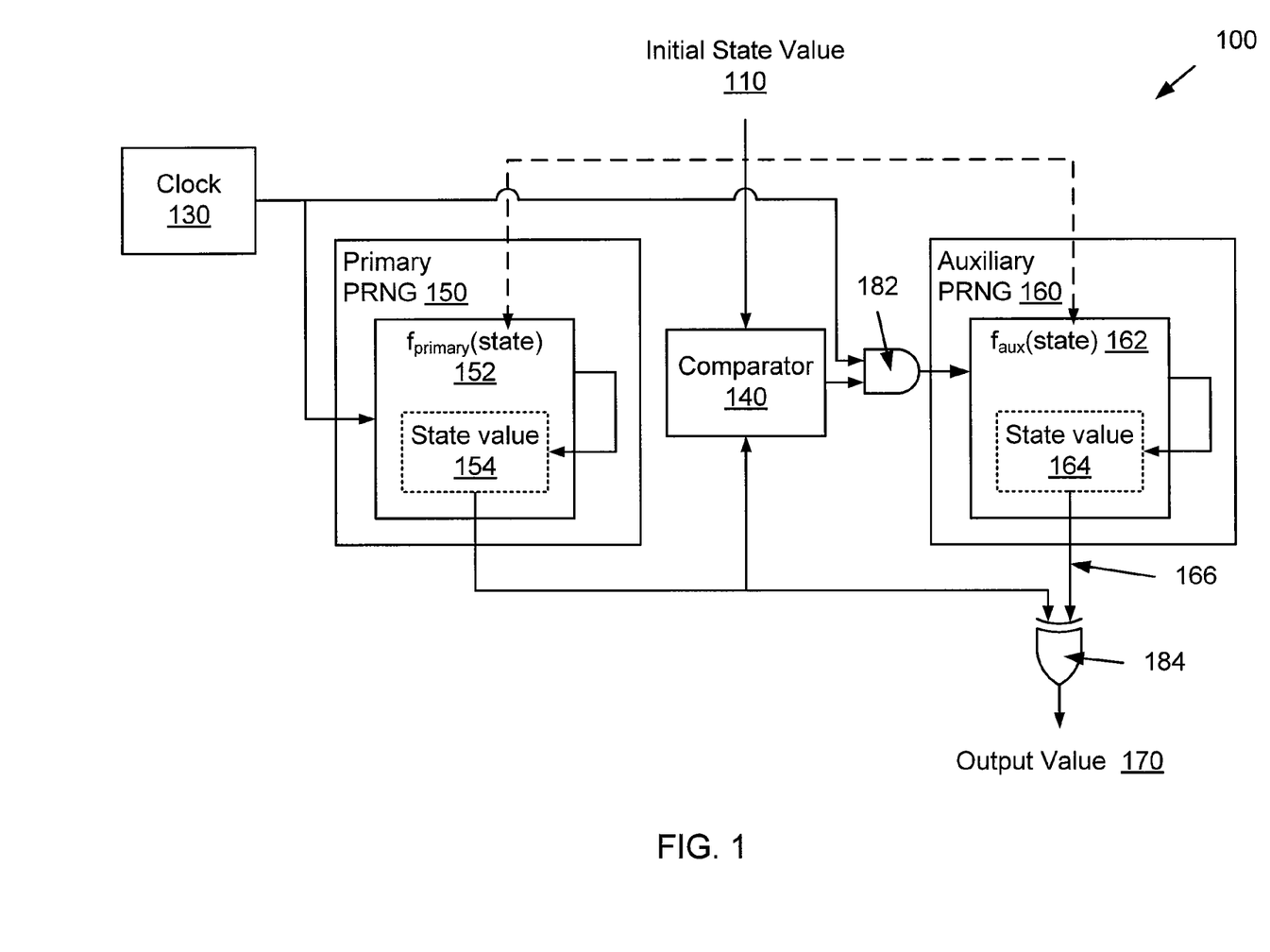
FIG. 1 is a schematic diagram of a random number generator, according to an embodiment of the invention.

FIG. 1 is a schematic diagram of a random number generator (RNG) 100, according to an embodiment of the invention. The RNG 100 includes two pseudo-random number generators (PRNGs)—an auxiliary pseudo-random number generator 160 and a primary pseudo-random number generator 150. The PRNGs 150 and 160 are configured to produce output values that are based on different timing signals, and the output values are combined such that an output value 170 of the RNG 100 is substantially uniform and substantially uncorrelated over a specified time period/window.

The primary PRNG 150 and auxiliary PRNG 160 are configured with pseudo-random number generator functions $f_{primary}(\ )$ 152 and $f_{aux}(\ )$ 162, respectively. When triggered (e.g., by a pulse within a clock signal), a state value 154 of the primary pseudo-random number generator 150 is transformed by function $f_{primary}(\ )$ 152 into a new state value starting with initial state value 110. The new state value is captured/latched within the function $f_{primary}(\ )$ 152 as the state value 154. The initial state value 110 can be referred to as a seed state. Similarly, when triggered, a state value 164 of the auxiliary pseudo-random number generator 160 is transformed by function $f_{aux}(\ )$ 162 into a new state value starting with the initial state value 110. The state values 154 and 164 correspond to used as the output values of the PRNGs 150 and 160, respectively.

Figure 2:
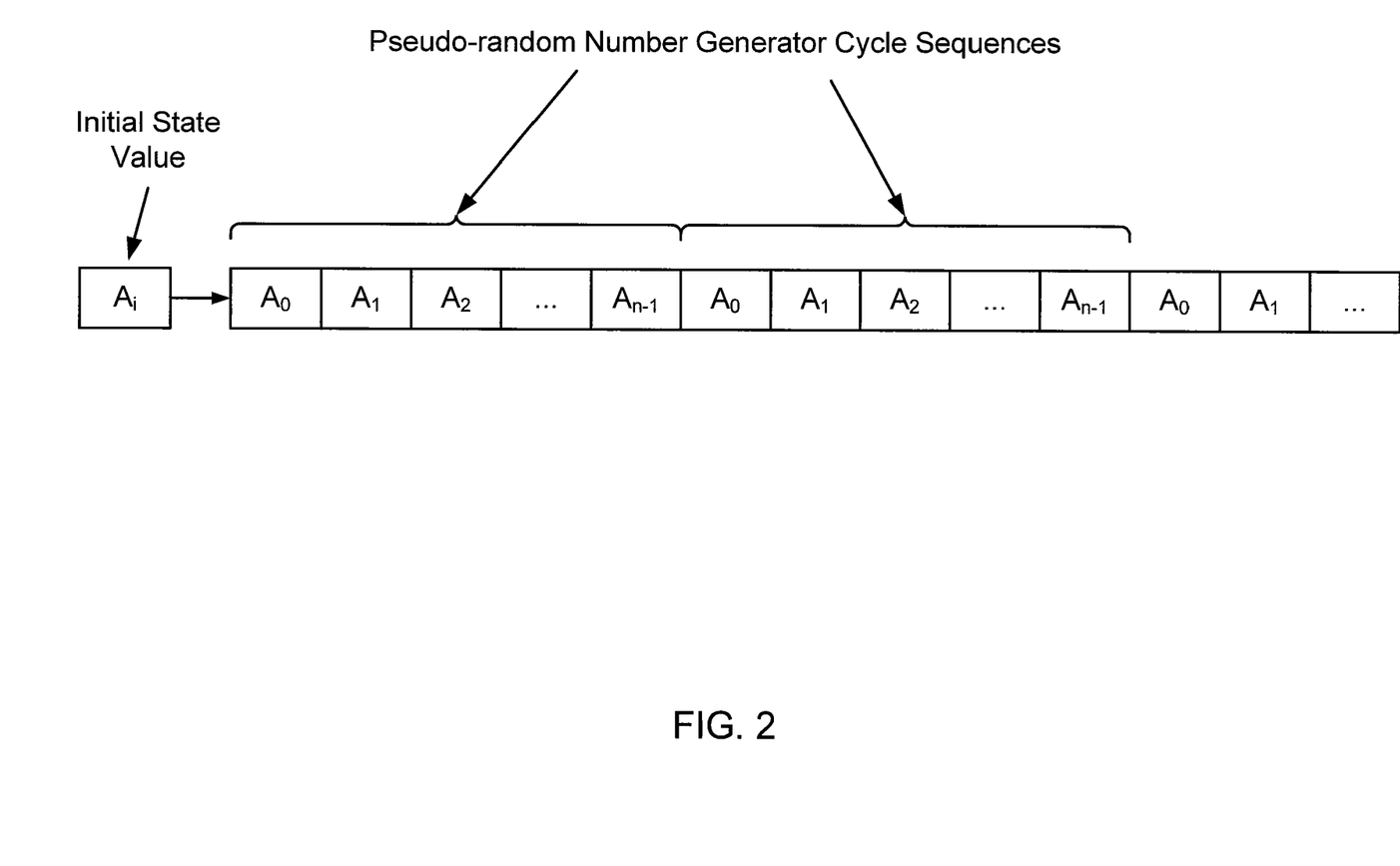
FIG. 2 illustrates an example of a set of state values produced by a pseudo-random number generator.

The PRNG functions, $f_{primary}(\ )$ 152 and $f_{aux}(\ )$ 162, as pseudo-random number generator functions, are each configured to generate a finite sequence of values in a periodic manner. For example, the function $f_{primary}(\ )$ 152 can be configured to incrementally produce, as shown in FIG. 2, all possible state values from a set of state values $A_0$ through $A_{n-1}$ based on an initial state value $A_i$. The set of state values $A_0$ through $A_{n-1}$ are referred to as a cycle sequence of the PRNG. Each value, A, can be a single bit value or a set of bits of any length, and values are repeated in the same order within each PRNG cycle sequence. The cycle time of the PRNG cycle sequence is a function of the frequency of a clock cycle used to trigger the PRNG to cycle through the values of the cycle sequence. For example, the cycle time required to cycle through the PRNG cycle sequence is shorter with a higher clock frequency.

In this embodiment, the functions $f_{primary}(\ )$ 152 and $f_{aux}(\ )$ 162, are implemented using linear feedback shift registers (LFSRs), however, in some embodiments, the functions 152 and 162 can be implemented using any type of pseudo-random number generator procedure/circuit. For example, a function within a pseudo-random number generator can be based on a generalized feedback shift register, a lagged Fibonacci generator, a linear congruential generator, and so forth. Any portion of the random number generator 100 can be implemented in hardware and/or software, and any portion of the random number generator 100 can be combined into a single module or implemented in separate modules.

The uniform and uncorrelated output of the RNG 100 is achieved by modifying (e.g., permutating) the state value 154 of the primary PRNG 150 using the state value 164 of the auxiliary PRNG 160. The clock 130 can be generated by a periodic stimulus, such as an oscillator, or generated in response to an event, such as a network collision. Specifically, the states values 154 and 164 are combined such that different repetitions of the cycle sequence of the primary PRNG 150 are modified by each state value 156 from the cycle sequence of the auxiliary PRNG 160. This result is accomplished, in this embodiment, by combining the state values 154 and 164 using an exclusive-or (XOR) function 184, and by incrementing the state value 164 output of the auxiliary PRNG 160 based on the state value 154 of the primary PRNG 150. The result of the XOR function 184 is the output value 170 of the random number generator 100. A specific example of a set of output values from a random number generator such as random number generator 100 is illustrated in FIGS. 3A through 3E.

Referring back to FIG. 1, the state value 154 of the primary PRNG 150 is incremented on every clock cycle (or pulse) generated by the clock 130. The auxiliary PRNG 160, however, is incremented on a clock cycle from the clock 130 only when the state value 154 from the primary PRNG 150 equals the initial state value 110. In other words, the state value 164 of the auxiliary PRNG 160 is dependent on the state value 154 of the primary PRNG 150, and the auxiliary PRNG 160 is only incremented once during each cycle sequence of the primary PRNG 150. To accomplish this timing configuration, a comparator 140 is configured, in this embodiment, to output a high value when the state value 154 of the primary PRNG 150 is equal to the initial state value 110. When the output of the comparator 140 and the clock signal from the clock 130 are simultaneously high, an output signal from an AND gate 182 (conjunctive combination of the outputs of the comparator 140 and the clock 130) triggers the auxiliary PRNG 160 to increment. The PRNGs 150 and 160 within the RNG 100 can be referred to as cascaded PRNGs.

Although in this embodiment, the incrementing of the auxiliary PRNG 160 is triggered directly by the state value 154 of the primary PRNG 150, in some embodiments, the auxiliary PRNG 160 can be triggered to produce a new state value output based on, for example, a counter (not shown). The counter can be configured to cause the auxiliary PRNG 160 to increment at any time during the cycle sequence of the primary PRNG 150. For example, the auxiliary PRNG 160 can be configured to increment at the end of every cycle sequence of the primary PRNG 150 in response to a signal from the counter or based on a separate clock signal. In some embodiments, for example, the auxiliary PRNG 160 can be configured to increment (e.g., based on a counter or using a comparator) after every two cycle sequences of the primary PRNG 150 or twice during each cycle sequence of the primary PRNG 150.

The state values 154 and 164 can be received dynamically by the XOR gate 184 (and rippled through the XOR gate 184) as new state values are computed or sent at specified times (e.g., based on the clock 130) to the XOR gate 184 from the PRNGs 150 and 160. For example, the state values 154 and 164 can be latched in a register (not shown) and sent to the XOR gate 184 only when an output value 170 is needed by a downstream module (not shown). In some embodiments, the state values 154 and 164 can be transformed (e.g., masked, transposed, and so forth) before being output/sent to the XOR gate 184. Although the output value 170 is the result of an XOR operation, in some embodiments, the output value 170 can be produced using any logical combination of the outputs of the primary PRNG 150 and auxiliary PRNG 160. For example, a logical module such as a multiplication module can produce/calculate an output value 170 based on the state values 154 and 164.

In some embodiments, the primary PRNG 150 and the auxiliary pseudo-random number generator 160 can be initiated using different initial states (not shown). The initial state value 110 can be a random number produced, for example, using a random number generator (e.g., physical random number generator). The initial state value 110 can also be referred to as an initial state vector.

Figure 3A:
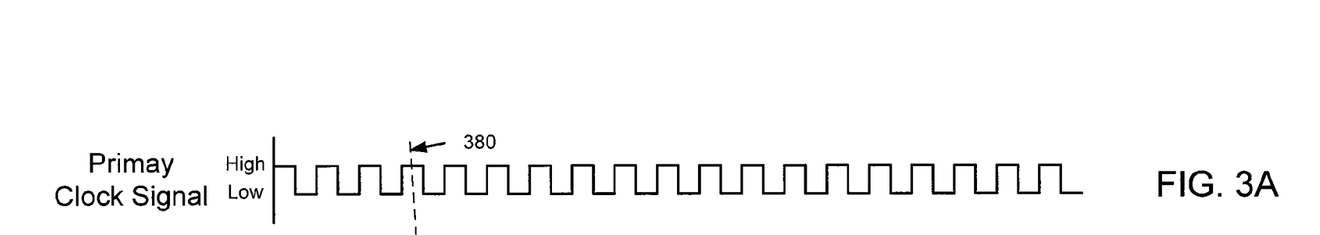
FIG. 3A is a schematic graph that illustrates a primary clock signal that is used to trigger a primary pseudo-random number generator to incrementally produce an output value, according to an embodiment of the invention.
Figure 3B:
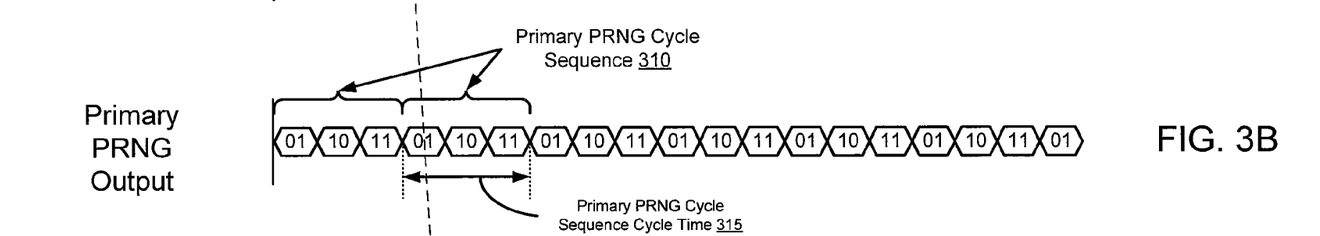
FIG. 3B illustrates the output values of the primary pseudo-random number generator when incremented on each clock cycle of the primary clock signal shown in FIG. 3A, according to an embodiment of the invention.
Figure 3C:
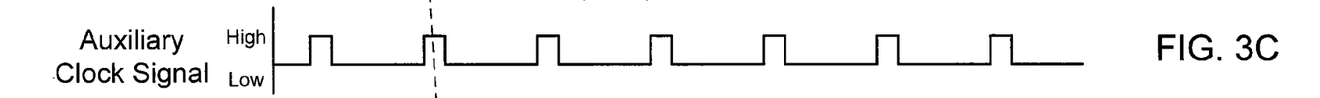
FIG. 3C is a schematic graph that illustrates an auxiliary clock signal that is used to trigger an auxiliary pseudo-random number generator to incrementally produce an output value, according to an embodiment of the invention.
Figure 3D:
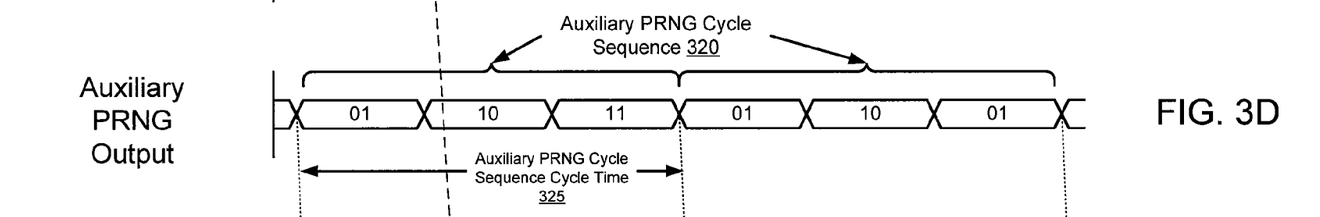
FIG. 3D is a graph that illustrates output values produced by the auxiliary pseudo-random number generator on each clock cycle of the auxiliary clock signal shown in FIG. 3C, according to an embodiment of the invention.
Figure 3E:
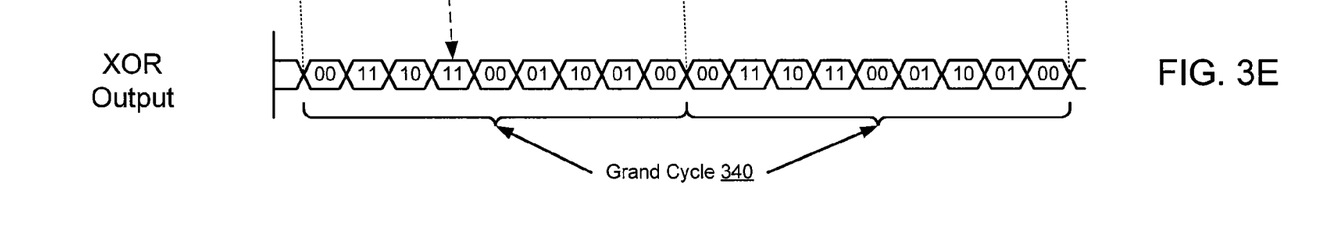
FIG. 3E illustrates an output of an exclusive-or combination of the output values of the primary pseudo-random number generator shown in FIG. 3B and the output values of the auxiliary pseudo-random number generator shown in FIG. 3D, according to an embodiment of the invention.

FIGS. 3A through 3E are a schematic graphs that illustrate the clock rates (FIGS. 3A and 3C), state (i.e., intermediate) values (FIGS. 3B and 3D), and output values (FIG. 3E) associated with a random number generator, according to an embodiment of this invention. FIGS. 3A through 3E are all on the same time scale and are oriented so that time is increasing to the right. A person of ordinary skill in the art should appreciate that the behavior and timing of the outputs from the modules/components within the random number generator can vary significantly depending upon, for example, process variation, design implementations, timing delays through additional latches or modules, and so forth. The dashed arrow 380 starting at FIG. 3A and continuing through the figures to FIG. 3E illustrates the timing relationship between the figures.

FIG. 3A is a schematic graph that illustrates a primary clock signal that is used to trigger a primary PRNG associated with a random number generator to incrementally produce an output value. FIG. 3B illustrates the output values (or current state values) of the primary PRNG as incremented in response to each clock cycle of the primary clock signal shown in FIG. 3A. Line 380 shows that the pulse of the clock cycle of the primary clock signal shown in FIG. 3A triggers the primary PRNG to incrementally produce an output value "01" as shown in FIG. 3B. The cycle sequence of the primary PRNG 310, as shown in FIG. 3B, is a repeating sequence with three values that are each two-bits in length. In some embodiments, the primary PRNG is configured to incrementally produce an output value on only certain clock cycles (e.g., every other clock cycle). Note that a cycle sequence cycle time 315 of the primary PRNG output is defined by the clock rate of the primary clock signal.

FIG. 3C is a schematic graph that illustrates an auxiliary clock signal that is used to trigger an auxiliary PRNG associated with the random number generator to incrementally produce an output value. The auxiliary clock signal shown in FIG. 3C is configured to pulse once during each primary PRNG cycle sequence 310. In this embodiment, the auxiliary clock signal is configured to pulse once at the beginning of each primary PRNG cycle sequence 310. Because the primary PRNG cycle sequence 310 includes three, two-bit values and the primary PRNG increments on each clock cycle of the primary clock signal, the clock rate of the auxiliary clock signal (FIG. 3C) is three times slower than that of the primary clock signal (FIG. 3A). The clock rate can also be referred to as the effective clock frequency.

FIG. 3D is a graph that illustrates output values (or current state values) incrementally produced by the auxiliary PRNG on each clock cycle/pulse of the auxiliary clock signal shown in FIG. 3C. Line 380 shows that the pulse of the clock of the auxiliary clock signal shown in FIG. 3C triggers the auxiliary PRNG to incrementally produce an output value "10" as shown in FIG. 3D. Like the cycle sequence of the primary PRNG 310, the cycle sequence of the auxiliary PRNG 320, as shown in FIG. 3D, is a repeating sequence with three values that are each two-bits in length. In fact, in this embodiment, the values and order of the cycle sequence of the auxiliary PRNG 320 are identical to the values and order of the cycle sequence of the primary PRNG 310. However, the cycle time 325 of the auxiliary PRNG cycle sequence 320 is three times longer than the cycle time 315 of the primary PRNG cycle sequence 310 because of the slower auxiliary clock signal clock rate.

In some embodiments, the auxiliary PRNG cycle sequence 320 can be different (e.g., different order, numbers of values, values, value lengths, and so forth) than that of the primary PRNG cycle sequence 310. Although a zero (e.g., "00") is not included in the primary PRNG cycle sequence 310 or the auxiliary PRNG cycle sequence 320, in some embodiments, a zero can be inserted into either of the cycle sequences of the primary PRNG 310 or auxiliary PRNG 320 at any point during their respective cycle sequences.

FIG. 3E illustrates an output of an exclusive-or (XOR) combination of the output values of the primary PRNG shown in FIG. 3B and the output values of the auxiliary PRNG shown in FIG. 3D. In some embodiments, the XOR output shown in FIG. 3E is the output of the random number generator. Line 380 illustrates that the "01" output value of the primary PRNG is combined in an XOR combination with the "10" output value of the auxiliary PRNG to produce the value "11" of the XOR output shown in FIG. 3E.

Also, as shown in FIG. 3E, the XOR output is substantially uncorrelated during a grand cycle 340 of the XOR output as a result of the modifying of each two-bit value within the primary PRNG cycle sequence 310 (shown in FIG. 3B) by one, two-bit value of the cycle sequence of the auxiliary PRNG 320 (shown in FIG. 3D). Because the entire set of two-bit values from each cycle sequence of the primary PRNG 310 is modified by a single two-bit value from the output of the auxiliary PRNG, the uniform nature of the primary PRNG cycle sequence 310 is preserved in the XOR output. However, the sequence of two-bit values in the primary PRNG cycle sequence 310 is not repeated (e.g., uncorrelated) in the grand cycle 340 of the XOR output because each repetition of the primary PRNG cycle sequence 310 is modified by a new value from the auxiliary PRNG cycle sequence 320 during the grand cycle 340. Note that FIGS. 3D and 3E show that the duration of the grand cycle 340 is equivalent in duration to the cycle time 325 of the auxiliary PRNG cycle sequence 320.

In some embodiments, a hidden state technique or bitmasking technique can be employed so that not all of the bits from the output state values of the primary PRNG and/or the auxiliary PRNG are used in a random number generator. For example, consider a primary PRNG that is configured to produce/calculate a pseudo-random output state value that is X bits in length. When employing a hidden state technique, a random number generator uses only Y bits (where Y<X) from the output state value of the primary PRNG. The Y bits that are used can be referred to as the observed state bits, and the bits that are not used can be referred to as hidden state bits or masked bits. The hidden state technique can be used, in some embodiments of this invention, to increase the cycle sequence of a PRNG without increasing the observed bits of state. In some embodiments, the primary PRNG and/or the auxiliary PRNG can be configured to implement the hidden state technique.

Although FIGS. 3A through 3E illustrate an example based on cycle sequences made up of two-bit values, PRNGs that produce values of any bit length or number of values within a cycle sequence can be used. Increasing the length of the output value of either one of these PRNGs can increase their cycle sequence and therefore the duration of the grand cycle 340. In some embodiments, the techniques described above can be used in conjunction with the hidden state technique to, for example, reduce correlation.

Figure 4A:
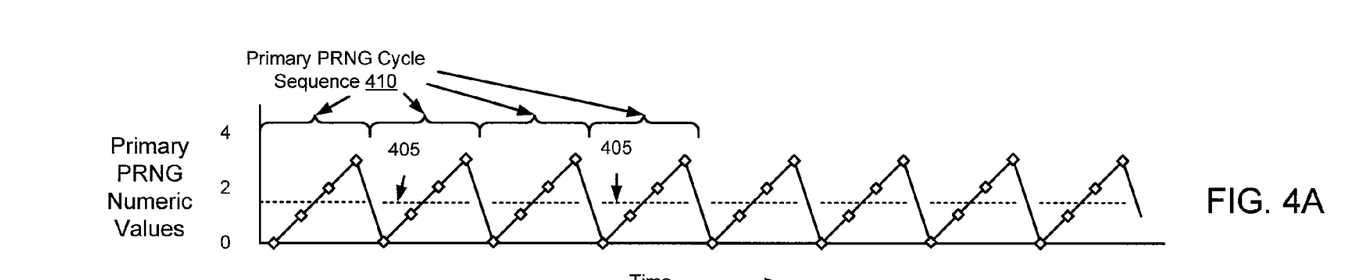
FIG. 4A is a schematic graph that illustrates the numeric output of a primary pseudo-random number generator, according to an embodiment of the invention.
Figure 4B:
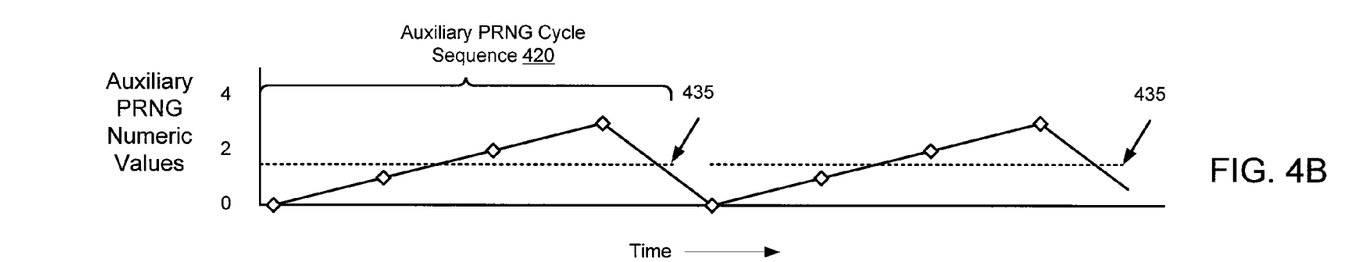
FIG. 4B is a schematic graph that illustrates the numeric output of an auxiliary pseudo-random number generator, according to an embodiment of the invention.
Figure 4C:
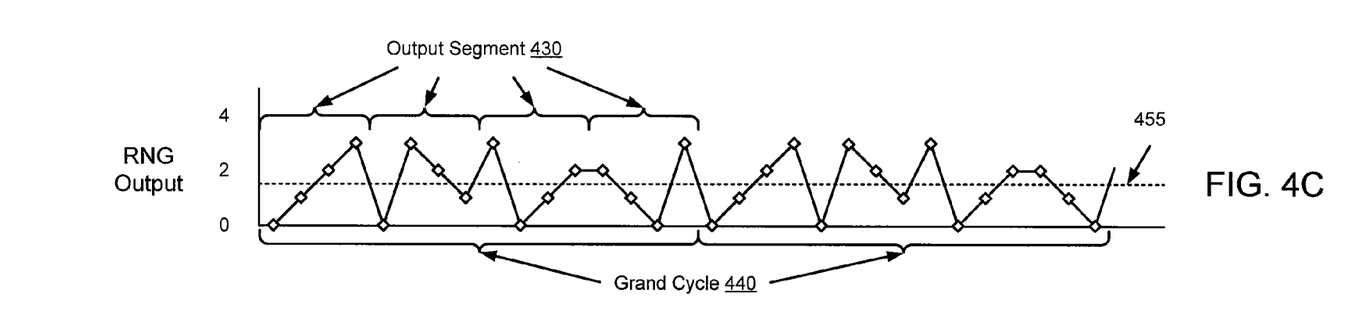
FIG. 4C is a schematic graph that illustrates an output of a random number generator, according to an embodiment of the invention.
Figure 4D:
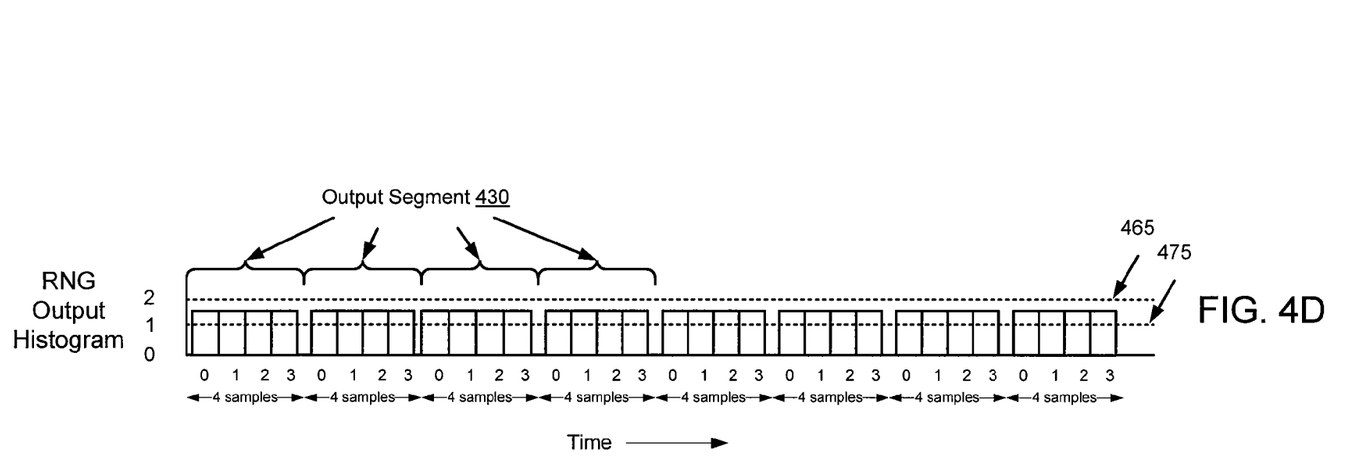
FIG. 4D is a schematic histogram of the random number generator output of FIG. 4C, according to an embodiment of the invention.
Figure 4E:
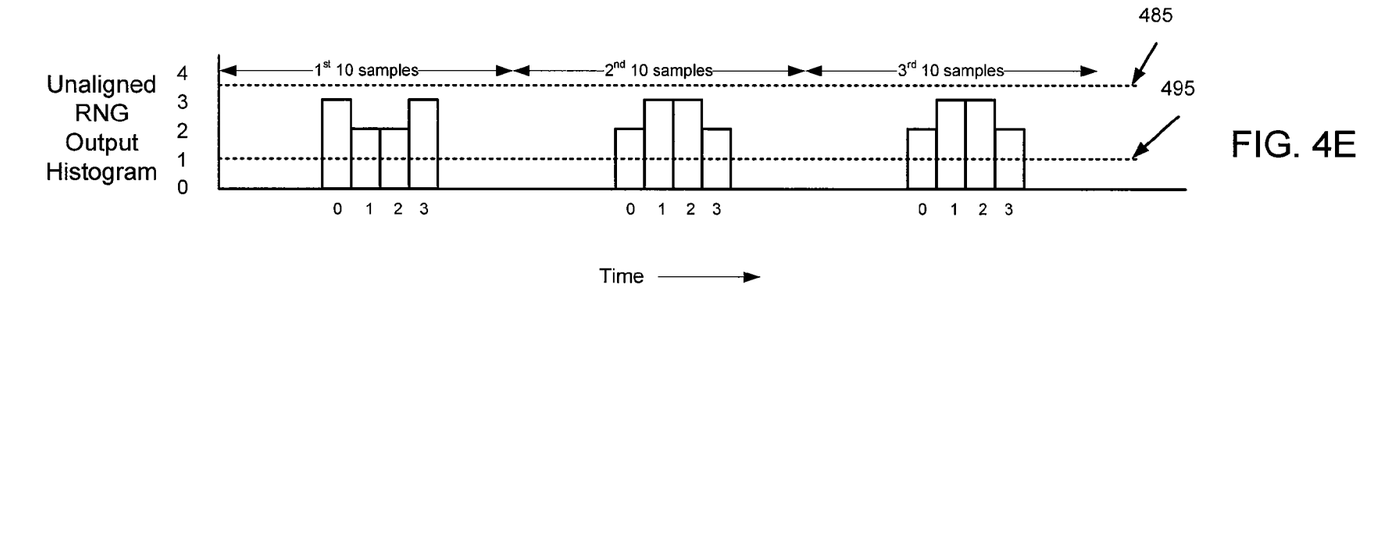
FIG. 4E is a schematic histogram of the random number generator output of FIG. 4C, according to an embodiment of the invention.

FIGS. 4A through 4E are schematic graphs that illustrate some of the statistical characteristics of a random number generator configured in accordance with an embodiment of this invention. FIGS. 4A and 4B are graphs that illustrate the numeric outputs of a primary PRNG and an auxiliary PRNG, respectively, with zeroes inserted at the beginning of each of their cycle sequences. FIG. 4C is a graph that illustrates an output of the random number generator. FIGS. 4D and 4E are a schematic histograms of the RNG output of FIG. 4C. Although time increases to the right in these figures, the relative timing between the graphs (e.g., timing differences caused by delays) is not explicitly illustrated.

FIGS. 4A and 4B show that the primary PRNG cycle sequence 410 and the auxiliary PRNG cycle sequence 420, respectively, are highly uniform, but also highly correlated. The PRNG cycles 410 and 420 include the numbers 0, 1, 2, and 3, in that order. As shown in FIGS. 4A and 4B, the average numeric values within each of the primary PRNG cycle sequences 410 and the auxiliary PRNG cycle sequences 420, respectively, are highly uniform because they each converge at an average value of 1.5 (see lines 405 and 435). Consequently, the average numeric value across all of the output values of the primary PRNG and all of the output values of the auxiliary PRNG also uniformly converge at 1.5 (see lines 405 and 435). However, the primary PRNG numeric output values and the auxiliary PRNG numeric output values are also highly correlated because the values and order of values within their respective repeating cycle sequences 410 and 420 are identical over each cycle sequence.

The random number generator output shown in FIG. 4C is a logical combination of the output of the primary PRNG shown in FIG. 4A and the output of the auxiliary PRNG shown in FIG. 4B. In this embodiment, the output of the RNG in FIG. 4C is an exclusive-or (XOR) combination. The RNG output includes output segments 430 that correspond with the primary PRNG cycle sequences 410. In this embodiment, all of the values from the primary PRNG cycle sequence 410—the values 0, 1, 2, and 3—are included in each output segment 430 of the RNG output.

The RNG output is uniformly distributed, but also substantially uncorrelated. In this embodiment, over any chosen interval (or sample size), the frequency of occurrence of the values of the RNG output is similar. The RNG output histogram shown in FIG. 4D illustrates that within each of the output segments 430 each value occurs exactly once. However, the order of the values (0 through 3) for each of the output segments 430 is highly uncorrelated. One example of correlation is when a specified value is always followed by another specified value. In fact, in this example, the order of the values is not repeated within an output segment 430 within a grand cycle 440. The order of values within each of the output segments 430 of each grand cycle 440 are uncorrelated because the RNG output is a result of the primary PRNG output being modified by values from the auxiliary PRNG cycle sequence 420. The unaligned RNG output histogram shown in FIG. 4E illustrates that even over an interval (or set of sample values) not corresponding to the output segments 430 the values still occur roughly the same number of times, and within specified and/or predictable bounds 485 and 495. Although the samples shown in FIG. 4E each include the same number of values, in some embodiments, the samples can include different numbers of values.

Correlation where a certain value is always followed by another certain value is unlikely to occur within a given grand cycle. Expressed mathematically, if the primary PRNG produces a cycle sequence $a_1$ through $a_n$ and the auxiliary PRNG produces a cycle sequence $b_1$ through $b_n$, then RNG output$_1$=$a_1$^$b_1$. This value is followed by RNG output$_2$=$a_2$^$b_1$. In the second repetition of the output values of the primary PRNG, at some point m in the cycle sequence of the primary PRNG, when $a_m$=$a_1$^$b_1$^$b_2$, the value RNG output$_1$ will appear as RNG output$_{N+m}$=$a_m$^$b_2$=$a_1$^$b_1$^$b_2$^$b_2$=$a_1$^$b_1$=RNG output$_1$. RNG output$_{N+m}$ will be followed by RNG output$_{N+m+1}$, which (ignoring wrap-around) has the value $a_{m+1}$^$b_2$. So we see that in one case the value RNG output$_1$ is followed by RNG output$_2$ and in another by RNG output$_{N+m+1}$. It is highly unlikely that RNG output$_2$=RNG output$_{N+m+1}$ because it is highly unlikely that the next value in the pseudo-random sequence, $a_{m+1}$, would be exactly equal to $a_2$^$b_1$^$b_2$.

The sequence of output values from the RNG according to this invention have more desirable uniformity characteristics than that of a single PRNG employing a hidden state technique. Consider an LFSR of order N, using N bits of state, and a maximal polynomial with output values in the range of 1 to $2^N-1$ within a cycle sequence. After $2^N-1$ output values, the cycle sequence from the LFSR will have a defined order of output values that will start to repeat. If H bits of state are added as hidden state bits to the observable bits N, the repetition time will be $2^{(N+H)}-1$. The output values from the hidden state LFSR taken over $2^{(N+H)}-1$ observations will show a nearly uniform histogram, with each value occurring $2^H$ times (with the exception of 0). This uniform property, however, will typically not be preserved over a small observation period. For example, within a window of M samples where $M<2^{(N+H)}-1$, a given value typically cannot occur more than $2^H$ times. As M approaches $2^H$, very non-uniform histograms can arise even though the output values from the LFSR will uniformly converge when $M>>2^{(N+H)}-1$. In contrast, the output values from a random number generator according to an embodiment of this invention, as shown in FIGS. 4A through 4E, using (N+H) bits of state divided between two PRNGs, will have substantially uniform histograms over the same observation period. Within a window of W samples where $W<2*(2^N-1)$ the frequency of occurrence of a value from the random number generator can be no more than +/−1 different from the frequency corresponding to a uniform distribution.

Referring back to FIGS. 4A through 4E, the number of values within the cycle sequences 410 and 420, the order of values within the cycle sequences 410 and 420, the length of values (e.g., byte length) within the cycle sequences 410 and 420, the mathematical combination used to produce the RNG output, and so forth, can be defined to produce particular statistical properties. For example, the primary PRNG cycle sequence 410 and the auxiliary PRNG cycle sequence 420 can be modified such that the unaligned RNG output histogram shown in FIG. 4E has specified statistical properties that will, for example, fall within the specified limits 485 and 495. The primary PRNG cycle sequence 410 and the auxiliary PRNG cycle sequence 420 can be modified such that a specified set of values within the unaligned RNG output histogram of FIG. 4E falls within, for example, chi-square limits on uniformity, a range of specified values, average value (mean, median or mode), and/or other metrics and/or limits that are used to measure bias or non-uniformity.

Figure 5:
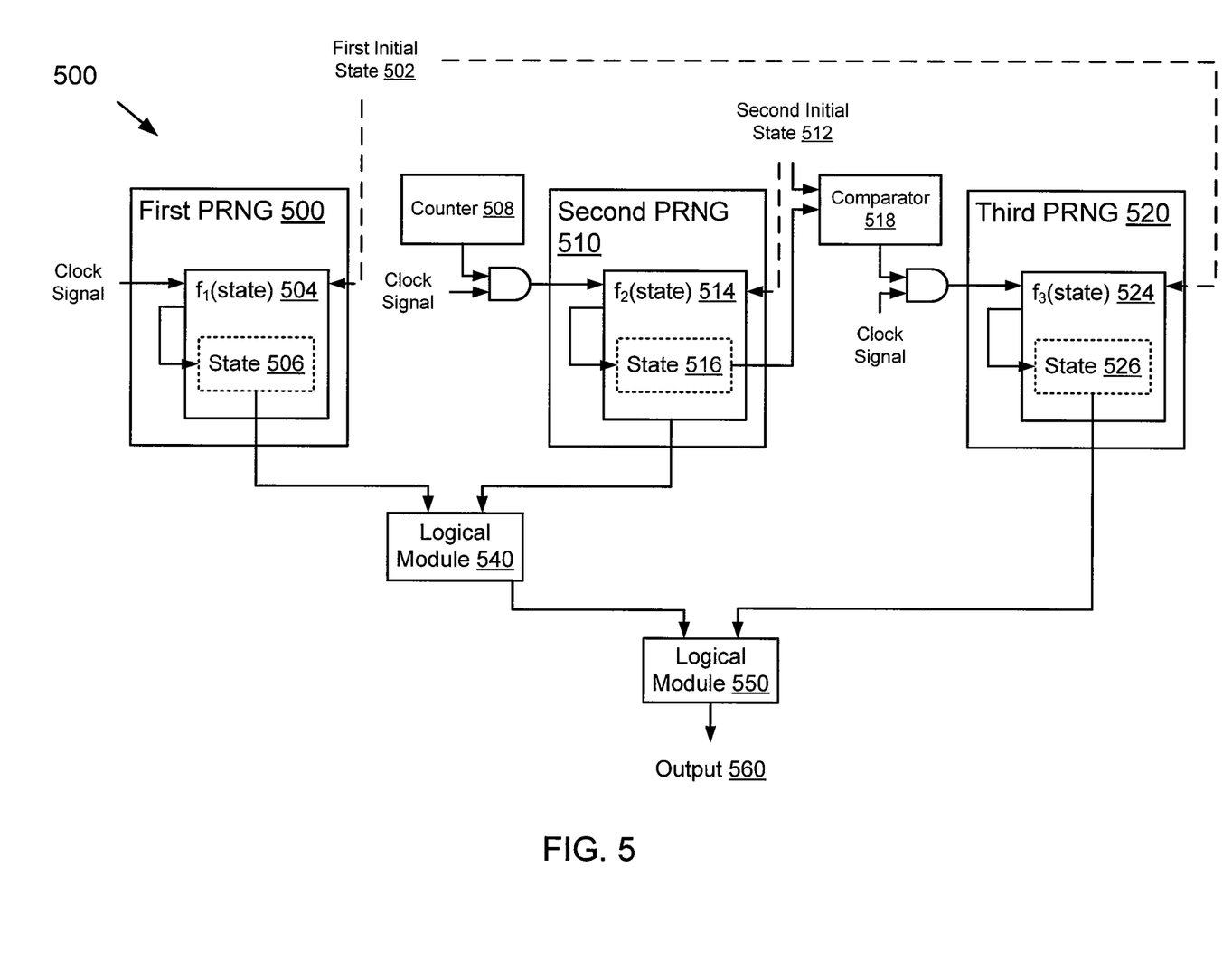
FIG. 5 is a schematic diagram of a random number generator that includes three cascaded pseudo-random number generators, according an embodiment of the invention.

FIG. 5 is a schematic diagram of a random number generator 500 that includes three cascaded pseudo-random number generators, 500, 510, and 520, according to an embodiment of the invention. FIG. 5 shows that an output of a first PRNG 500 is modified by an output of a second PRNG 510 using a logical module 540. Although the second PRNG 510 is incremented in response to a signal from a counter 508, the counter 508 is configured to trigger the second PRNG 510 to increment based on the number of values within a cycle sequence associated with the first PRNG 500. The output of the logical module 540 is modified by an output of a third PRNG 520 that is incremented based on a cycle sequence of the second PRNG 510. The output of the logical module 540 is combined with the output of the third PRNG 520 using logical module 550 to produce the output 560 of the random number generator 500.

The functions $f_1()$ 504, $f_2()$ 514, and $f_3()$ 524 can each be any type of pseudo-random number generator function such as a generalized feedback shift register, a lagged Fibonacci generator, and/or a linear congruential generator. The logical modules 540 and 550 can implement any kind of logical operation such as an XOR operation, AND operation, or a multiplication operation or a cryptographic hash operation. In this embodiment, a first initial state value 502 is used to initiate the first PRNG 500 and the third PRNG 520. A different second initial state value 512 is used to initiate the second PRNG 510. One or more of the output state values from the PRNGs 500, 510, and/or 520 can be masked (e.g., using a hidden state technique) before being combined using the logical modules 540 and 550.

Figure 6:
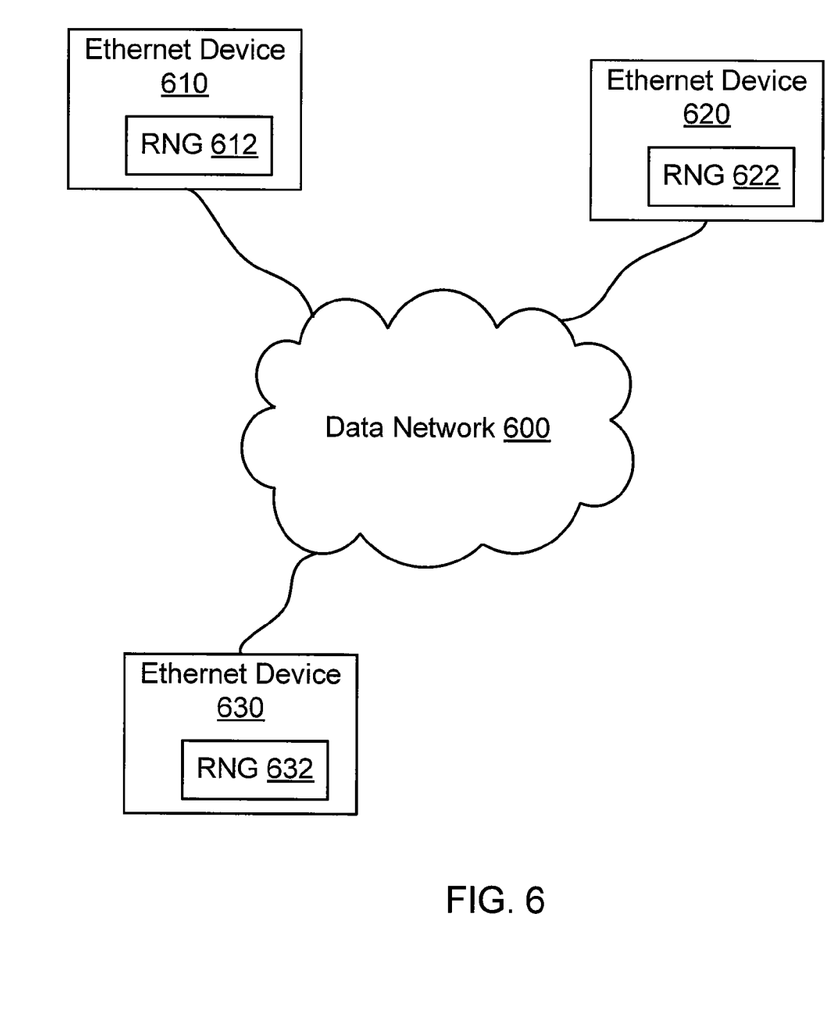
FIG. 6 is a schematic diagram that illustrates random number generators being implemented in a collision detection and/or avoidance protocol, according to an embodiment of the invention.

The random number generators designed according to embodiments of this invention can be used in many applications. FIG. 6 illustrates one such example. FIG. 6 is a schematic diagram that illustrates random number generators 612, 622, and 632 being used in a collision avoidance protocol of Ethernet devices 610, 620, and 630, respectively, according to an embodiment of the invention. Ethernet devices 610, 620, and 630 (e.g., Ethernet devices based on the IEEE 802.3 half-duplex standard) are configured to send signals over data network 600. Output values produced by the random number generators 610, 620, and 630 are used in the collision detection protocol (e.g., Ethernet Carrier Sense Multiple Access/Collision Detect (CSMA/CD)) used by the respective Ethernet devices 610, 620, and 630.

The random number generators 610, 620, and 630, in this embodiment of the invention, are configured to produce a random number output that is substantially uniform and substantially uncorrelated over a specified time window. The substantially uniform and uncorrelated output values of the random number generators 610, 620, and 630 are used to define a delay period that will reduce the possibility that any one of the Ethernet devices 610, 620, and/or 630 will preferentially transmit before any other. The substantially uniform and uncorrelated output values of the random number generators 610, 620, and 630 are also used to reduce the possibility that a deadlock transmission situation will develop after, for example, two of the Ethernet devices 610, 620, and/or 630 pick an identical delay value for a transmission attempt. A simultaneous transmission can cause a data collision that could result in corrupted bits and/or lost packets. A similar use for this invention would be in wireless 802.11 networks with a collision avoidance protocol (e.g., Ethernet Carrier Sense Multiple Access/Collision Avoidance (CSMA/CA), or IEEE 802.11e Enhanced Distributed Channel Access (EDCA)).

In conclusion, embodiments of the invention provide, among other things, improved methods and apparatus for producing a computationally-based random number. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. An apparatus, comprising:
a first pseudo-random number generator configured to produce a first sequence of values at a first clock rate;
a second pseudo-random number generator configured to produce a second sequence of values at a second clock rate, the second clock rate being based on the first sequence of values and the first clock rate; and
a logical module connected to the first pseudo-random number generator and the second pseudo-random number generator, the logical module being configured to produce an output value based on at least a portion of a value from the first sequence of values and at least a portion of a value from the second sequence of values,
wherein the first clock rate is associated with a first clock signal, the second clock rate is associated with a second clock signal,
the apparatus further comprising:
a comparator configured to trigger a pulse of the second clock signal when a value from the first sequence of values is equal to an initial state value.

2. The apparatus of claim 1, wherein a length of the value from the first sequence of values and a length of the value from the second sequence of values are different.

3. The apparatus of claim 1, wherein at least one of the first pseudo-random number generator and the second pseudo-random number generator includes at least one of a linear feedback shift register, a generalized feedback shift register, a lagged Fibonacci generator, and a linear congruential generator.

4. An apparatus, comprising:
a first pseudo-random number generator configured to produce a first sequence of values at a first clock rate;
a second pseudo-random number generator configured to produce a second sequence of values at a second clock rate, the second clock rate being based on the first sequence of values and the first clock rate; and
a logical module connected to the first pseudo-random number generator and the second pseudo-random number generator, the logical module being configured to produce an output value based on at least a portion of a value from the first sequence of values and at least a portion of a value from the second sequence of values,
wherein the first clock rate is associated with a first clock signal, the second clock rate is associated with a second clock signal,
the apparatus further comprising:
a counter configured to trigger a pulse of the second clock signal based on a cycle time associated with the first sequence of values.

5. The apparatus of claim 4, wherein the output value is used in at least one of a collision avoidance protocol related to a data network or a collision detection protocol related to the data network.

6. The apparatus of claim 4, wherein the logical module is configured to perform an exclusive-or operation.

* * * * *